United States Patent Office 2,706,676
Patented Apr. 19, 1955

2,706,676

THE CONVERSION OF FLUORINE TO HYDROGEN FLUORIDE BY SUPERHEATED STEAM

Charles R. Schmitt and Seymour H. Smiley, Oak Ridge, Tenn., assignors to the United States of America as represented by the United States Atomic Energy Commission No Drawing. Application December 24, 1952,
Serial No. 327,916

4 Claims. (Cl. 23—153)

Our invention relates to an improved process for the disposal of fluorine and more particularly to the conversion of fluorine to hydrogen fluoride.

In industrial operations in which fluorine is not completely consumed, it is frequently necessary to provide for the disposal of the excess fluorine. The matter of disposal is important, not only from the health standpoint, but also from a psychlogical standpoint, since process operators are frequently annoyed by even low concentrations of the gas. Despite the great reactivity of fluorine, adequate means of disposal are comparatively limited. A number of disposal methods are known, and some of them are briefly indicated below.

One disposal method involves the venting of fluorine to the atmosphere. This method is satisfactory only when atmospheric conditions are ideal, for winds may carry the gas for long distances, resulting in deleterious effects on crops and tress as well as on people. Another method involves the reaction of fluorine with sodium chloride or calcium chloride wherein chlorine is produced, which can then be absorbed by soda lime or a lime slurry. In still another method, fluorine is reacted with aqueous solutions of 5% to 10% caustic soda. Fluorine may also be removed by burning in a flame employing hydrocarbon fuel under conditions such that fluorine provides the oxidation normally furnished by oxygen in air. Finally, fluorine may be adsorbed on the lower valence state fluorides of such metals as silver, antimony and cobalt. The resulting higher valence state fluorides may then be reduced back to their lower states by hydrogen, and the hydrofluoric acid thus formed can be condensed in a refrigerated trap. All of these methods, however, possess some serious limitations among which are health hazards, the formation of possibly explosive by-products, high equipment, reagent and operation costs.

In addition to the above methods, Slesser and Schram report in "Preparation, Properties, and Technology of Flourine and Organic Fluoro Compounds," National Nuclear Energy Series, Vol. VII–1, that flourine may also be disposed of by water scrubbing. They state, however, that the disposal of fluorine by water scrubbing is not satisfactory because, for unknown reasons, fluorine does not always react with water, and that explosions are frequently encountered under some circumstances, but not under others. In connection with the water scrubbing of flourine they report, on page 73, that "The reaction [of flourine] occurred with either hot or cold water, but there were violent explosions with steam." A great variety of by-products are obtained in these reactions such as, for example, HF, $H_2O_2$, $O_3$, $OF_2$, and $OF_3$ which, it is believed, contribute to the erratic reactions or explosions and to the general unmanageability of the process.

An object, therefore, of our invention is to provide an improved process for the disposal of flourine.

Another object of our invention is to provide a process for the non-hazardous disposal of flourine which does not involve undesirable reaction by-products and probable harmful explosions.

Still another object is to provide a continuous process for the quantitative conversion of flourine to hydrogen fluoride.

Other objects and advantages of our invention will be apparent from the following detailed description.

In accordance with our present invention, flourine may be continuously converted to hydrogen fluoride by a process which comprises continuously contacting in a reaction zone fluorine and superheated steam, both preheated to a temperature sufficient to yield an average mixture temperature of at least approximately 500° F., and continuously withdrawing the resulting reaction products and excess unreacted superheated steam from said reaction zone.

When employing our process, the reaction between the superheated steam and flourine is easily initiated and is unexpectedly controllable; and the flourine is substantially completely converted to hydrogen fluoride, which may be conveniently disposed of. The employment of the method herein described, in striking contrast to the experience of the art, avoids the formation of the undesirable by-products which may cause the explosions and other erratic reactions noted in the Schlesser and Schram reference.

We find that the temperatures employed are one of the most critical features of our invention and that the temperatures described herein should be utilized to insure the quantitative conversion of flourine to hydrogen fluoride and to prevent the formation of potentially explosive and undesirable by-products. Generally, the fluorine which is to be contacted with the superheated steam should be preheated to a temperature within the range of approximately 500° F. to approximately 850° F. Since in most plant-scale fluorine disposal operations, fluorine may contain varying amounts of air, air-diluted fluorine containing less than about 50 mole percent fluorine should be preheated to a temperature of at least approximately 750° F., while air-diluted fluorine containing more than about 50 mole percent fluorine should be preheated to a temperature of at least approximately 500° F. We find that the superheated steam should also be preheated to a temperature within the range of about 500° F. to about 850° F. The superheated steam should be preheated to a temperature of at least approximately 750° F. in cases where it is to be contacted with air-diluted fluorine containing less than about 50 mole percent fluorine, while the superheated steam should be preheated to a temperature of at least approximately 500° F. in cases where it is to be contacted with air-diluted fluorine containing more than about 50 mole percent fluorine.

It is noted that sufficient heat may be supplied by other methods to initiate the reaction and to prevent the formation of undesirable by-products. For example, one of the reactants may be employed at a lower temperature, while the temperature of the other reactant may be compensatorily increased. In this procedure the gases should be heated to a temperature sufficient to yield an average mixture temperature of at least approximately 500° F. In any event, it is critical that the steam still be superheated, that is, heated to a temperature higher than that of saturated steam at the same pressure. However, we decidedly prefer to employ the above preferred temperatures, since the risk of the formation of undesirable by-products is needlessly increased during that instant before a heat transfer occurs between the gases of reduced and compensatorily increased temperatures.

It is preferred to use quantities of superheated steam substantially in excess of stoichiometric requirements. While the particular excess of superheated steam employed is not critical, we prefer to employ about 200% to about 500% stoichiometric excesses.

Our invention may be satisfactorily practiced employing widely varying flow-rates of superheated steam and fluorine. We prefer to use, however, flourine flow-rates of about 1.5 to about 3.5 pounds per hour per square inch of reactor cross-section area, and superheated steam flow-rates of about 2.5 to about 8.5 pounds per hour per square inch of reactor cross-section area. It should be noted that the flow-rate selected in any particular case should provide for a stoichiometric excess of steam.

The gaseous hydrogen fluoride resulting from the reaction of preheated fluorine and superheated steam, as described herein, may be easily disposed of by a number of different processes and the particular process selected is not crucial. For example, the hydrogen fluoride may be removed from the reaction zone where it is formed and introduced into a caustic spray tower or water spray tower, or into a lime bath. We prefer to introduce the gaseous hydrogen flouride into a water spray tower and drain off the resulting aqueous hydrofluoric acid into a lime bath for neutralization.

The disposal of the oxygen resulting from the reaction of the superheated steam and the preheated fluorine presents, of course, no substantial problem in view of the harmless nature of this gas, and it need not necessarily be considered in the selection of a hydrogen fluoride disposal system. The oxygen may either dissolve in the hydrogen fluoride disposal solution, or may escape to the atmosphere. For example, in the case where a water spray tower system is used to dispose of the gaseous hydrogen fluoride, the oxygen partially dissolves in the water and partially escapes to the atmosphere.

Numerous suitable systems may be employed with our invention. One suitable system may comprise, briefly, fluorine and steam supplies which are connected through separate preheaters to a nozzle leading into a conventional reactor provided on its exterior with cooling coils. The nozzle may comprise an outer cylindrical tube through which the superheated steam passes and an inner concentric cylindrical tube through which the fluorine passes. The reactor in turn may be connected by means of a pipe to a water spray tower at a position below the spray. An outlet at the bottom of the water spray tower may lead to an aqueous hydrofluoric acid neutralizing pit. While the apparatus construction material is not critical, we prefer to employ a corrosion-resistant material, such as Monel, in view of the corrosiveness of fluorine and hydrogen fluoride.

In a preferred form of our invention, fluorine, preheated to a temperature of at least about 500° F. is continuously introduced into a reactor at the rate of about 1.6 pounds per hour per square inch reactor cross-section area, while superheated steam preheated to a temperature of at least about 500° F., is simultaneously introduced into the reactor at the rate of about 4.5 pounds per hour per square inch reactor cross-section area. During the ensuing exothermic reaction a coolant is passed through the coils surrounding the reactor to maintain the reactor walls at a temperature of about 850° F. to about 1100° F. in order to prevent the reaction from proceeding too vigorously. The resulting gaseous hydrogen fluoride passes into the spray tower where it is contacted with the water spray. The resulting aqueous hydrofluoric acid drains to the bottom of the tower, from where it may be removed for neutralization.

The following example will illustrate our invention in greater detail.

*Example I*

Fluorine was continuously admitted into a fluorine preheater where it was heated to about 750° F. The fluorine preheater was of the baffled-head, hair-pin-tube type design and consisted of six 9 foot, 6 inch lengths of ½ inch schedule 40 Monel pipe encased by a stainless steel shell which was heated electrically by beaded Nichrome wire.

Steam was also introduced into a steam preheater of a design similar to the fluorine preheater where it was heated to about 750° F.

The preheated fluorine and resulting superheated steam were then continuously introduced into a reactor nozzle which extended into the reactor chamber for a distance of 2 inches. The nozzle assembly consisted of inner and outer concentrically aligned Monel tubes. The fluorine was introduced into the inner ⅜ inch tube and the steam into the outer ⅝ inch tube.

The fluorine was continuously metered through the inner tube of the nozzle assembly into the reactor at a flow-rate of about 10 pounds per hour while the superheated steam was continuously metered through the outer tube of the nozzle assembly into the reactor at a rate of about 14.2 pounds per hour.

The reactor chamber, which consisted of a 12 foot length of 2 inch schedule 40 Monel pipe inclined 2 inches per linear foot, had a cooling coil consisting of ⅜ inch copper tubing installed around the first five feet at the gas inlet end. With water employed as the coolant, the reactor was maintained at a temperature of about 900° F. A sample tap was provided for withdrawing samples of the fluorine-steam gaseous mixture from the reactor.

A mixture of the excess unreacted superheated steam and the resulting gaseous hydrogen fluoride was continuously removed from the reactor into the approximate center of a conventional water spray tower, and was condensed by water sprayed downward from two overhead nozzles. The resulting aqueous hydrofluoric acid drained to the bottom of the tower from which it was removed for neutralization in a lime pit.

In order to test the percentage completion of the reaction within the reactor, the following analytical test was made. A sample of the reactor gases was tapped from the reactor and then bubbled through 100 grams of 10% KI solution contained in filter flasks located at the sample tap. The solution was then analyzed for "apparent fluorine" (which is used herein to designate an oxidizing agent such as $F_2$, $F_2O$, $O_3$), by titrating with sodium thiosulphate and the percentage apparent fluorine in the outlet gas was calculated from the amount of reactor gas condensate collected. As determined by this test 99.4% of the fluorine had reacted with the superheated steam to form hydrogen fluoride.

In general, it may be said that the above example is merely illustrative and should not be construed as limiting the scope of our invention. Therefore, our invention should be understood to be limited only by the appended claims.

What we claim is:

1. A continuous process for the conversion of fluorine to hydrogen fluoride, which comprises continuously contacting in a reaction zone fluorine and a stoichiometric excess of superheated steam, each preheated to a temperature of at least approximately 500° F., and continuously removing the resulting gaseous hydrogen fluoride, the resulting oxygen and excess unreacted superheated steam from said reaction zone.

2. A continuous process for the conversion of fluorine to hydrogen fluoride, which comprises continuously contacting in a reaction zone fluorine and a stoichiometric excess of superheated steam, each preheated to a temperature of approximately 500° F. to approximately 850° F., and continuously removing the resulting gaseous hydrogen fluoride, the resulting oxygen and excess unreacted superheated steam from said reaction zone.

3. A continuous process for the quantitative conversion of fluorine to hydrogen fluoride, which comprises continuously introducing fluorine, heated to a temperature of approximately 500° F. to approximately 850° F., and superheated steam, approximately 200% to approximately 500% in excess of stoichiometric requirements, heated to a temperature of approximately 500° F. to approximately 850° F. into a reaction zone at rates of approximately 1.5 to approximately 3.5 pounds of fluorine per hour per square inch of reactor cross-section area and approximately 2.5 to approximately 8.5 pounds of superheated steam per hour per square inch of reactor cross-section area, maintaining said reaction zone at a temperature of approximately 850° F. to approximately 1100° F., and continuously removing the resulting gaseous hydrogen fluoride, the resulting oxygen, and the unreacted excess steam from said reaction zone.

4. An improved continuous process for the disposal of air-diluted fluorine, which comprises continuously introducing a fluorine-air mixture containing at least approximately 50 mole percent fluorine, preheated to a temperature of approximately 500° F. to approximately 850° F., and a stoichiometric excess of superheated steam, preheated to a temperature of approximately 500° F. to approximately 850° F., into a reaction zone at rates of approximately 1.5 to approximately 3.5 pounds of fluorine per hour per square inch of reactor cross-section area and approximately 2.5 to approximately 8.5 pounds of superheated steam per hour per square inch of reactor cross-section area, maintaining said reaction zone at a temperature of approximately 1000° F., continuously withdrawing the resulting gaseous hydrogen fluoride from said reaction zone, contacting the resulting removed gaseous hydrogen fluoride with a water spray, collecting the resulting aqueous hydrofluoric acid, and neutralizing said solution.

References Cited in the file of this patent

UNITED STATES PATENTS

| | | |
|---|---|---|
| 1,293,703 | Catlin | Feb. 11, 1919 |
| 2,632,689 | Latchum | Mar. 24, 1953 |

OTHER REFERENCES

Ephraim's "Inorganic Chemistry," fourth ed., revised (1943), page 217. Nordeman Publishing Co., Inc. N. Y.

J. W. Mellor's "A Comprehensive Treatise on Inorganic and Theoretical Chemistry," vol. 2, page 11 (1922 ed.), Longmans, Green and Co., N. Y.

"Fluorine Chem.," reprinted from Ind. and Eng. Chem., vol. 39, page 282 (March 1947).